(12) United States Patent
Buck

(10) Patent No.: US 9,059,445 B1
(45) Date of Patent: Jun. 16, 2015

(54) OPEN-ENDED BATTERY HOLDER

(71) Applicant: Donald G. Buck, Lompoc, CA (US)

(72) Inventor: Donald G. Buck, Lompoc, CA (US)

( * ) Notice: Subject to any disclaimer, the term of this patent is extended or adjusted under 35 U.S.C. 154(b) by 0 days.

(21) Appl. No.: 14/501,543

(22) Filed: Sep. 30, 2014

(51) Int. Cl.
| | |
|---|---|
| *H01M 2/10* | (2006.01) |
| *H01M 2/02* | (2006.01) |
| *H01M 10/04* | (2006.01) |
| *H01M 10/12* | (2006.01) |

(52) U.S. Cl.
CPC ............ *H01M 2/1022* (2013.01); *H01M 2/105* (2013.01); *H01M 2/1061* (2013.01); *H01M 10/0422* (2013.01); *H01M 2/022* (2013.01); *H01M 10/123* (2013.01); *H01M 2/0202* (2013.01); *H01M 2/0242* (2013.01); *H01M 2/1077* (2013.01); *H01M 2/026* (2013.01)

(58) Field of Classification Search
CPC . H01M 2/0202; H01M 2/022; H01M 2/0242; H01M 2/026; H01M 2/105; H01M 2/1077; H01M 10/0422; H01M 10/123
USPC ............. 429/96, 99, 100, 138, 143, 149, 163, 429/164, 167, 176
See application file for complete search history.

(56) References Cited

U.S. PATENT DOCUMENTS

| | | | |
|---|---|---|---|
| 2,089,402 A | 8/1937 | Murray | |
| 2,983,778 A | 5/1961 | Munse | |
| 4,702,975 A | 10/1987 | Fields | |
| D488,443 S | 4/2004 | Bailey | |
| 7,833,651 B2 | 11/2010 | Gastineau et al. | |
| 8,267,252 B2 * | 9/2012 | Foreman et al. | ............... 206/703 |
| 2007/0020512 A1 | 1/2007 | Wakuda et al. | |
| 2012/0263979 A1 | 10/2012 | Jensen | |

OTHER PUBLICATIONS

Space Savers, Multi Size Battery Storage Box by Dial, http://www.spacesavers.com/Storage/Battery-Storage/Multi-Size-Battery-Storage-Box-by-Dial, accessed Apr. 28, 2014.
Support Plus, Battery Storage Caddy, http://www.supportplus.com/supportplus/Daily-Living-Aids_1LA/View-All-Daily-Living-Aids_1LB/Item_s-Battery-Storage-Caddy_FC4652.html, accessed Apr. 28, 2014.
Storacell Management Systems, Storacell PowerPax, http://www.storacell.net/, accessed Apr. 28, 2014.

* cited by examiner

*Primary Examiner* — Patrick Ryan
*Assistant Examiner* — Ben Lewis
(74) *Attorney, Agent, or Firm* — SoCal IP Law Group LLP; Guy Cumberbatch

(57) ABSTRACT

A holder for consumer batteries and, more particularly, to an open-sided holder from which batteries can easily be accessed. The holder includes a central panel dividing first and second battery sheaths that project from either face thereof. Each sheath defines at least two cylindrical battery receptacles that are open at both ends and have a lumen diameter that closely receives a consumer battery, such as AA or AAA size. The central panel extends longitudinally beyond the sheaths and terminates in thickened end edges that retain the batteries within the receptacles. The thickness of the end edges relative to the rest of the central panel is small enough so that a user can push each battery out of its receptacle and past one of the end edges without much trouble.

20 Claims, 2 Drawing Sheets

OPEN-ENDED BATTERY HOLDER

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

FIELD OF THE INVENTION

The present application relates to a holder for consumer batteries and, more particularly, to an open-sided holder from which batteries can easily be accessed.

BACKGROUND OF THE INVENTION

A common type of battery (electric cell) for consumer electronic equipment is cylindrical, with top and bottom battery terminals separated by more than the battery diameter. Perhaps the most common of this type of battery is the AA battery which has a diameter of 14 millimeters, a body length of 48 mm, and a length between the ends of its opposite terminals of 50 mm. AAA batteries are smaller, and have a diameter of 10.5 millimeters, a body length of 44.5 mm, and a length between the ends of its opposite terminals of about 47.0 mm. While the batteries used for electronic devices are relatively small, it is not convenient to carry spare batteries in one's pocket or elsewhere on the person since they create an annoyance, and such loosely held spares may be forgotten. Further, if a consumer carries loose batteries for replacing dead batteries, and then mixes the two, he/she cannot readily (without testing) tell whether or not the battery is charged or discharged.

Battery holders are available, and usually include a molded plastic case with multiple receptacles or divider-created slots for holding batteries so that they do not move around. The case lid, when closed, secures the batteries within the case (and often from rolling around), and when the lid is opened the batteries can easily be lifted out. For instance, a case-type battery storage box with dividers for different battery sizes can be seen at http://www.spacesavers.com/Storage/Battery-Storage/Multi-Size-Battery-Storage-Box-by-Dial. Boxes and cases have their merits, but don't permit rapid access to the batteries and are often formed of opaque plastic which prevents seeing how many batteries are left at a glance.

PowerPax of St. Charles, Ill. manufactures a line of battery holders or caddies under the StoraCell™ battery management systems name. The holders include cylindrical receptacles that are not fully enclosed so one can see the battery, each with one closed end and one end having one or more small cantilevered pawls that hold the battery in place. To remove a battery one must push on an end corner of the battery nearest the closed end so that the top end forces the cantilevered pawls apart.

Despite several designs of prior consumer battery holders, there remains a need for a one-piece, unitary holder that permits easier access to the batteries.

SUMMARY OF THE INVENTION

A one-piece, unitary holder for consumer batteries and, more particularly, to an open-ended holder from which batteries can easily be inserted, stored or extracted. The holder includes a central panel dividing first and second battery sheaths that project from either face thereof. Each sheath defines at least two cylindrical battery receptacles that are open at both ends and have a lumen diameter that closely receives a consumer battery, such as AA or AAA size. The central panel extends longitudinally beyond the sheaths and terminates in thickened end edges that retain the batteries within the receptacles. The increased thickness of the end edges relative to the rest of the central panel is small enough so that a user can push each battery out of its receptacle and past either of the end edges without much trouble.

DESCRIPTION OF THE PREFERRED EMBODIMENTS

The present application provides a holder for batteries, in particular consumer batteries such as AA or AAA. Although the holder is particularly well-suited for elongated cylindrical consumer batteries such as AA or AAA, it may also be used to hold more squat D batteries or even rectilinear 9 V batteries. As will be described below, the holder includes sheaths defining receptacles for the batteries that are open on both ends. There are no electrical contacts, this being merely a holder and not a battery pack with a housing and contacts and an integral electrical circuit for insertion into a powered device. Both sheaths may hold live or dead batteries. Although a preferred embodiment of the holder has a capacity for holding eight batteries total, with one side having four live batteries and the other side having four dead batteries, the holder can be modified to receive more or less than eight batteries. For instance, for AA batteries, four receptacles for four batteries on each side of a panel is preferred, while a AAA battery unit may have more or less batteries, such as 3 or 6 batteries/side since many/most flashlights use 3 AAA batteries, and 3 or 6 battery/side is more useful.

Figure 1A:
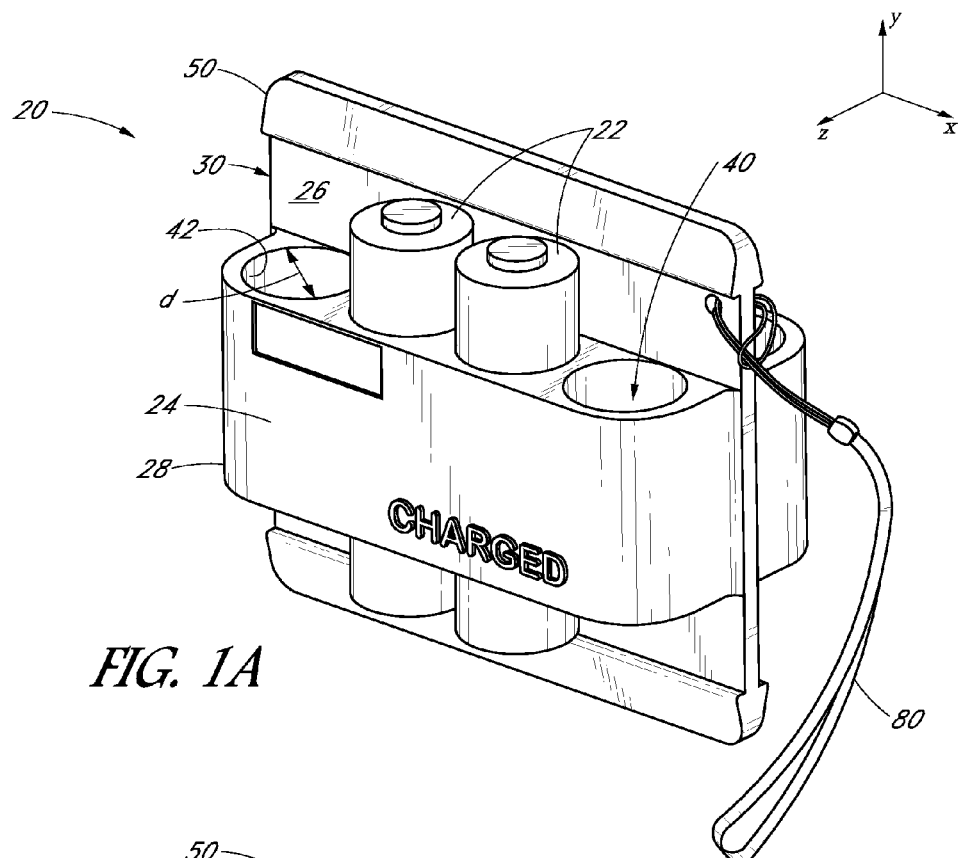
FIG. 1A is a front perspective view of an open-sided consumer battery holder of the present application showing two good AA batteries held within a first sheath on one face thereof.
Figure 1B:
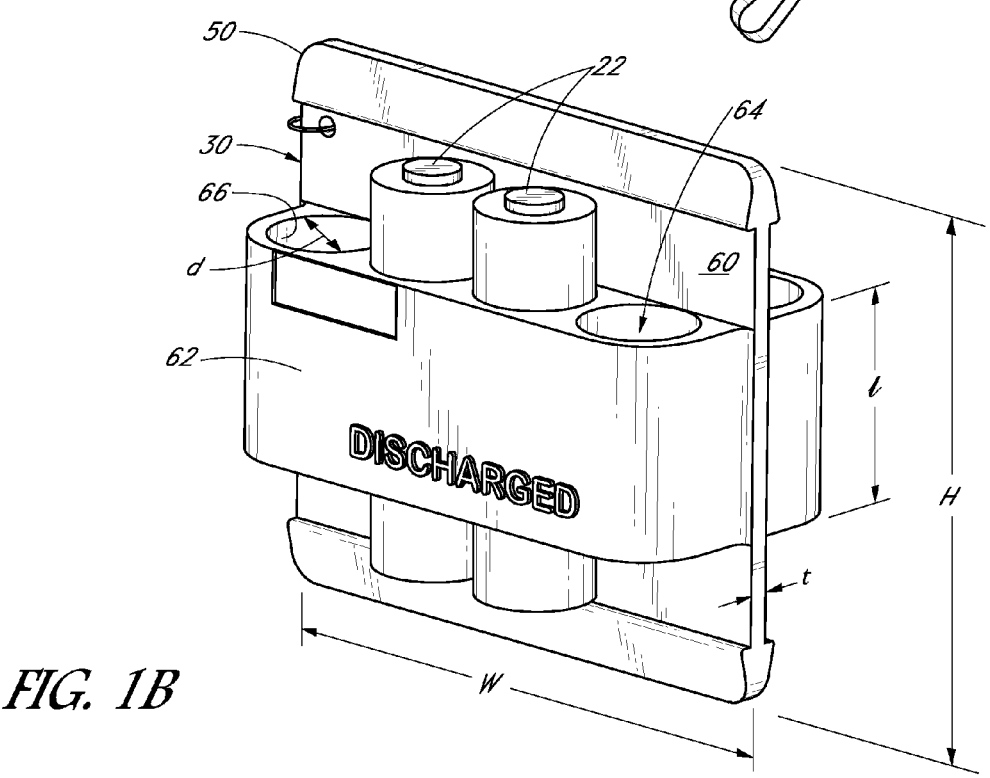
FIG. 1B is a rear perspective view of the battery holder showing two dead AA batteries held within a second sheath on an opposite face.
Figure 3:
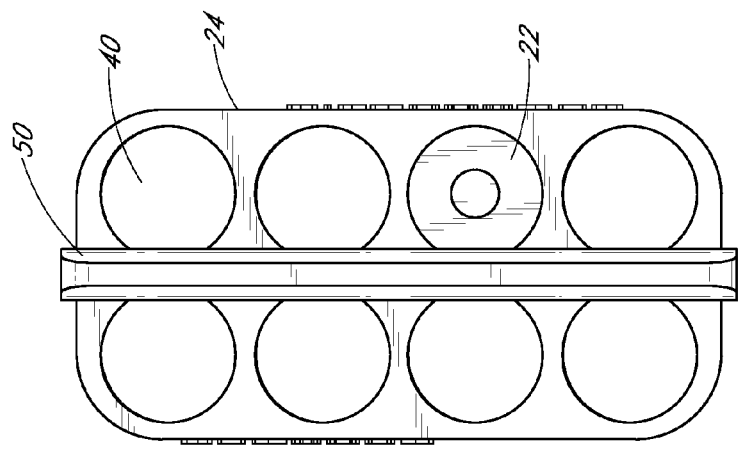
FIG. 3 is a top plan view of the battery holder and showing a single AA battery within one of the sheaths.

With reference to FIGS. 1A and 1B, the front of an open-sided consumer battery holder 20 of the present application is shown holding two good AA batteries 22 within a first sheath 24 on a first face 26 thereof. The first sheath 24 projects normally away from a planar central panel 30 having a width W along a width axis x, and a height H along a height axis y. A main portion of the central panel 30 is desirably relatively thin, with a thickness t along a thickness axis z that is perpendicular to both the width and height axes.

The first sheath 24 extends outward from the first face 26 along the thickness axis z and defines a plurality of first battery receptacles 40. The receptacles 40 are aligned with the height axis y. More particularly, the sheath 24 desirably comprises a generally rectilinear shape with rounded outer corners 28 parallel to the height axis y. The two good AA batteries 22 reside within the two middle receptacles 40 out of four total receptacles. In a preferred embodiment, each sheath 24 of the holder 20 is sized to hold at least two batteries 22, preferably at least four, and thus the width W of the holder 20 is greater than the consumer battery diameter times the number the sheath can hold. In the illustrated embodiment, the width W of the holder 20 is greater than four times the consumer battery diameter.

In a preferred embodiment, the entire holder 20 is molded from a suitable polymer, so that the sheath 24, central panel 30, and preferably a second sheath (described below) are formed integrally of a homogeneous material. The term, "one-piece, unitary" refers to the construction of the holder using a single molded piece, with no moving parts (aside from an optional wrist strap, as shown).

Figure 2B:
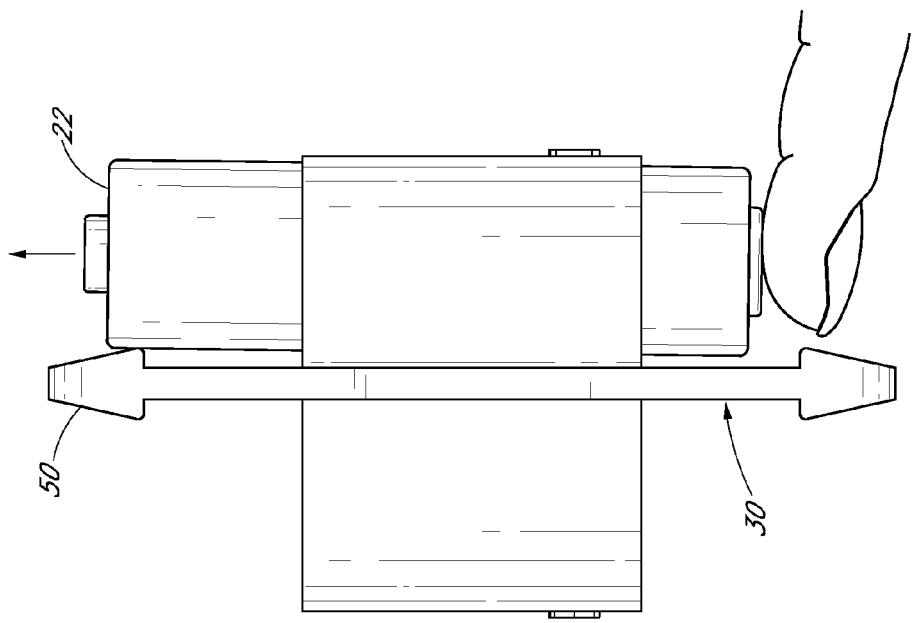
FIG. 2B is a side view of the battery holder showing a user pushing the AA battery out of the sheath.
Figure 2A:
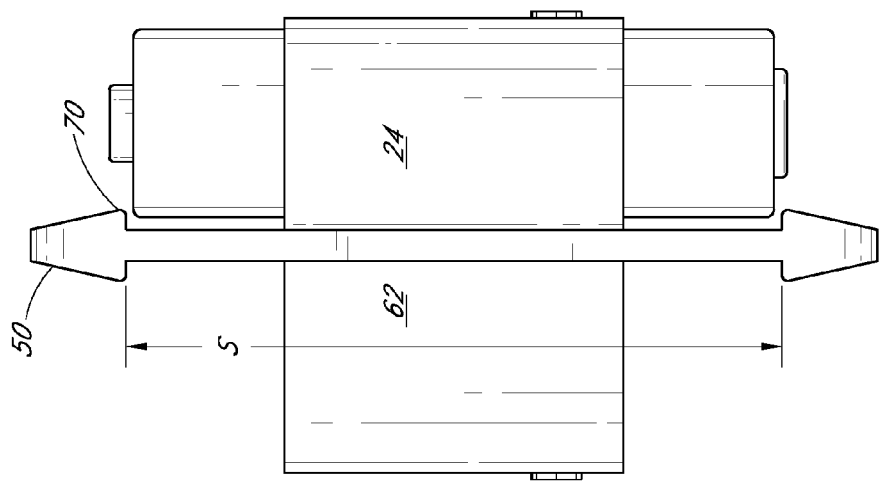
FIG. 2A is a side view of the battery holder showing a AA battery held within a sheath on one face thereof.

With reference to the empty receptacles 40 shown in FIG. 1A, and also to FIG. 2A, each battery receptacle 40 defines a cylindrical lumen 42 that is open on both ends and extends parallel to the height axis y. Each lumen 42 has an inner diameter d that is approximately the same as and preferably slightly greater than the consumer battery diameter. That is, the cylindrical batteries 22 fit closely within each lumen 42 so as to be slightly frictionally engaged therewith while at the same time being able to easily slide therethrough. According to both the Energizer Corp. and Duracell Corp. Product Data Sheets, an AA (or R6) battery measures 49.2-50.5 mm (1.94-1.99 in) in length including the button terminal—and 13.5-14.5 mm (0.53-0.57 in) in diameter. The positive terminal button is a minimum 1 mm high and a maximum 5.5 mm in diameter, and the flat negative terminal is a minimum diameter of 7 mm. According to both Energizer and Duracell, a AAA battery measures 43.3-44.5 mm (1.71-1.75 in) in length and 9.5-10.5 mm (0.37-0.41 in) in diameter. The length includes the positive terminal button which is a minimum 0.8 mm high and 3.8 mm in diameter, and the flat negative terminal has a minimum diameter of 4.3 mm. Therefore, for example, for AA batteries with an OD of 0.555", the inside cylindrical diameter d=0.570", while for AAA batteries with an OD of 0.404", the inside cylindrical diameter d=0.554".

Each of the first battery receptacles 40 has a length e that is less than the consumer battery length such that the batteries 22 are held within each receptacle with both ends projecting therefrom. In a preferred embodiment, for either AA or AAA batteries, the length 1 is about 1.0", and the receptacles are centered in the holder 20, so that about 0.35-0.50 inches of each battery sticks out from each end of the receptacle, depending on the type of battery.

To more securely retain the batteries 22 within the receptacles 40 (supplementing the frictional retention forces), the holder 20 includes two end edges 50 that project outward from the central panel 30. More particularly, the two end edges 50 extend parallel to the width axis x and are spaced from each other a distance S slightly greater than the consumer battery length, as seen in FIG. 2A. Each receptacle 40 is tangent on one side along the length axis with the first face 26 of the panel 30 such that a battery in the receptacle lies against or is otherwise coincident with the first face. The end edges 50 project outward from the first face 26 along the thickness axis z sufficiently far to interfere with linear movement of the batteries 22 out of the receptacles 40. However, the thickness of the end edges 50 is not so great as to prevent removal of the batteries 22, as will be explained below. In general, the end edges 50 retain the batteries 22 within the receptacles 40, but permit their removal.

FIG. 1B illustrates the holder 20 from the rear, opposite from that shown in FIG. 1A. The central panel 30 defines a second face 60 opposite the first face 26, and a second sheath 62 projecting outward therefrom. In a preferred embodiment, the second sheath 62 is identical to the first sheath 24 so as to enable retention of the same number and type of consumer batteries. However, it will be understood that the sheaths 24, 62 may be configured differently so is to hold different numbers or types of batteries.

As with the front side of the battery holder 20, the second sheath 62 defines a plurality of second battery receptacles 64 for holding consumer batteries 22, two of which are shown in the middle two receptacles out of four total receptacles. Once again, the receptacles 64 each define a lumen 66 having a diameter d that is approximately the same as the battery diameter. Furthermore, the length of the receptacles 64 is less than the consumer battery length such that both ends of the consumer batteries extend out of the receptacles. Finally, the end edges 50 of the central panel 30 also project away from a second face 68 of the holder and retain the batteries 22 within the receptacles 64.

In the illustrated embodiment, the front side of the battery holder 20 is indicated for retention of "live" or charged batteries 22, while the rear side is used to store "dead" or discharged batteries. Embossed indicia or lettering on both sides of the sheaths 24, 62 as shown may be used to indicate the condition of the batteries. In the illustrated embodiment, the words "CHARGED" and "DISCHARGED" are provided, though other terminology may be used. In use, a wearer of the battery holder 20 may carry a number of live batteries on one side of the central panel 30, for use in replacing dead batteries in one more devices. The dead batteries can then be inserted into the receptacles 64 in the second sheath 62 to avoid confusion. The particular indicia on the respective battery sheaths that symbolize whether that sheath holds "live" or "dead" batteries may be lettering as shown, plus ("+") or minus ("−") signs, green (live) or red (dead) icons, or other such easily understood indicia.

FIG. 2A is a side view of the battery holder 20 showing a AA battery 22 held within a first sheath 24 on one face thereof. The length of the consumer battery 22 is slightly less than the spacing S between the end edges 50 on the central panel 30. Corners 70 on the end edges 50 that face the consumer battery 22 are rounded, as are typical consumer battery corners. Consequently, a user may easily push the AA battery 22 out of the sheath 24, as seen in FIG. 2B. The material of the holder 20 is desirably polypropylene or other such moldable plastic which permits the user to easily push the battery 22 past the end edges 50. That is, the end edges 50 either deform or flex when the battery is pushed past.

To maintain the batteries in place within the holder 20 while facilitating their removal, the corners 70 on the end edges 50 are spaced apart (spacing S) farther than the battery length. The interference of the projecting corners 70 that gets in the way of freely sliding the batteries in either direction out of the receptacles 40 is the only structure retaining the batteries in place, to enable easy removal. In a preferred embodiment, about 1.6 mm (1/16 in) spacing between the cylindrical corners of a battery and the end edges 50 is provided to prevent significant linear movement of the battery while permitting a minimum of movement to help in the removal from the sheath 24. At the same time, the thickness t of the central panel 30 is desirably about 1.90 mm (0.075 in), and each end edge 50 has a total thickness of about 4.75 mm (0.187 in), so that each end edge 50 sticks out from the central panel 30 by about 1.4 mm (0.56 in), such as between about 1.0 and 2.0 mm.

As seen in FIGS. 1A and 1B, a wrist strap 80 or other such strap is desirably secured to an upper corner of the battery holder 20. More particularly, the wrist strap 80 may loop through an aperture formed through the central panel 30. A wrist strap is an option for the battery holder, the battery holder may or may not be packaged with one.

While several illustrative embodiments of the invention have been shown and described, numerous variations and alternate embodiments will occur to those skilled in the art, and can be made without departing from the scope of the invention as defined in the appended claims.

What is claimed:

1. An open-ended, one-piece, unitary holder for consumer batteries, the consumer batteries each having a length, a width and a thickness, comprising:
   a central panel having a width along a width axis, a height along a height axis, and a thickness smaller than either the width or height along a thickness axis perpendicular to both the width and height axes, wherein the height is greater than the consumer battery length, and the width is greater than twice the consumer battery width, the central panel having a first face and a second face opposite thereto;
   a first battery sheath projecting away from the first face of the central panel parallel to the thickness axis, the first battery sheath having at least two first battery receptacles each defining a lumen extending parallel to the height axis that is open on both ends and has a lumen width and thickness that are approximately the same as the consumer battery width and thickness, the first battery receptacles each having a length that is less than the consumer battery length such that a consumer battery may be slid into each first battery receptacle and project from both ends thereof;
   a second battery sheath projecting away from the second face of the central panel parallel to the thickness axis, the second battery sheath having at least two second battery receptacles defining a lumen extending parallel to the height axis that is open on both ends and has a lumen width and thickness that are approximately the same as the consumer battery width and thickness, the second battery receptacles each having a length that is less than the consumer battery length such that a consumer battery may be slid into each second battery receptacle and project from both ends thereof; and
   wherein the central panel further includes two end edges extending parallel to the width axis and spaced from each open end of the first and second battery receptacles, wherein each end edge projects outward from both the first and second faces of the central panel and wherein the spacing between the end edges is slightly greater than the consumer battery length such that the end edges retain the consumer batteries placed in any of the first or second battery receptacles.

2. The holder of claim 1, wherein the consumer batteries are cylindrical and the receptacle lumens are also cylindrical.

3. The holder of claim 2, wherein the consumer batteries are AA or AAA type batteries.

4. The holder of claim 1, wherein the consumer batteries are 9V batteries.

5. The holder of claim 1, wherein indicia on the first battery sheath symbolizes that the batteries retained within the first battery sheath are charged.

6. The holder of claim 5, wherein indicia on the second battery sheath symbolizes that the batteries retained within the second battery sheath are dead.

7. The holder of claim 6, wherein the indicia on the first and second battery sheaths comprises embossed lettering spelling out, respectively, "CHARGED" and "DISCHARGED."

8. The holder of claim 1, wherein there are at least four receptacles defined by each of the first and second battery sheaths.

9. The holder of claim 1, further including a wrist strap secured to a top corner of the central panel.

10. The holder of claim 1, wherein each end edge projects outward from the respective faces of the panel between about 1.0 and 2.0 mm.

11. The holder of claim 1, wherein each end edge projects outward from the respective faces of the panel by about 1.4 mm.

12. The holder of claim 11, further including a wrist strap secured to a top corner of the central panel.

13. The holder of claim 11, wherein each end edge projects outward from the first face of the panel by about 1.4 mm.

14. An open-ended one-piece, unitary holder for cylindrical consumer batteries, the consumer batteries each having a length and a diameter, comprising:
   a panel having a width along a width axis, a height along a height axis, and a thickness smaller than either the width or height along a thickness axis perpendicular to both the width and height axes, wherein the height is greater than the consumer battery length, and the width is greater than twice the consumer battery diameter, the panel having a first face and a second face opposite thereto;
   a first battery sheath projecting away from the first face of the panel parallel to the thickness axis, the first battery sheath having at least four cylindrical first battery receptacles each defining a lumen extending parallel to the height axis that is open on both ends and has a lumen diameter that is approximately the same as the consumer battery diameter, the first battery receptacles each having a length that is less than the consumer battery length such that a consumer battery may be slid into each first battery receptacle and project from both ends thereof, and wherein each receptacle is tangent on one side with the first face of the panel such that a battery in any receptacle lies against the first face;
   the panel further including two end edges extending parallel to the width axis and spaced from each open end of the first battery receptacles, wherein each end edge projects outward from the first face of the panel between about 1.0 and 2.0 mm and wherein the spacing between the end edges is greater than the consumer battery length such that the end edges are the only structure that retains the consumer batteries placed in any of the first battery receptacles.

15. The holder of claim 14, wherein the consumer batteries are AA or AAA type batteries.

16. The holder of claim 14, wherein indicia on the first battery sheath symbolizes that the batteries retained within the first battery sheath are charged.

17. The holder of claim 14, further including:
   a second battery sheath projecting away from the second face of the panel parallel to the thickness axis, the second battery sheath having at least two second battery receptacles defining a lumen extending parallel to the height axis that is open on both ends and has a lumen diameter that is approximately the same as the consumer battery diameter, the second battery receptacles each having a length that is less than the consumer battery length such that a consumer battery may be slid into each second battery receptacle and project from both ends thereof.

18. The holder of claim 17, wherein indicia on the second battery sheath symbolizes that the batteries retained within the second battery sheath are dead.

19. The holder of claim 18, wherein indicia on the first battery sheath symbolizes that the batteries retained within the first battery sheath are charged.

20. The holder of claim 19, wherein the indicia on the first and second battery sheaths comprises embossed lettering spelling out, respectively, "CHARGED" and "DISCHARGED."

* * * * *